United States Patent

Thetford et al.

(10) Patent No.: US 6,743,855 B1
(45) Date of Patent: Jun. 1, 2004

(54) POLYESTER ASSOCIATION THICKENERS

(75) Inventors: Dean Thetford, Manchester (GB); Stuart Barnett, Manchester (GB)

(73) Assignee: Avecia Limited, Manchester (GB)

( * ) Notice: Subject to any disclaimer, the term of this patent is extended or adjusted under 35 U.S.C. 154(b) by 33 days.

(21) Appl. No.: 10/111,606

(22) PCT Filed: Sep. 19, 2000

(86) PCT No.: PCT/GB00/03592

§ 371 (c)(1), (2), (4) Date: Apr. 26, 2002

(87) PCT Pub. No.: WO01/30882

PCT Pub. Date: May 3, 2001

(30) Foreign Application Priority Data

Oct. 28, 1999 (GB) ............................................. 9925416

(51) Int. Cl.$^7$ ........................... C08F 2/16; C09D 11/00
(52) U.S. Cl. ................... 524/800; 528/275; 528/300; 528/307; 524/81; 524/608; 106/31.13
(58) Field of Search .................. 528/275, 300, 528/307; 524/81, 608, 800; 106/31.13

(56) References Cited

U.S. PATENT DOCUMENTS 4,659,492 A  4/1987  Jahnke
4,749,500 A  6/1988  Forsberg et al.

FOREIGN PATENT DOCUMENTS

EP  09272796  10/1997
GB  2 008 146 A  5/1979

OTHER PUBLICATIONS

M. Keyanpour et al., Iran J. Polym. Sci. Technol. (Persian Ed.), vol. 9, No. 1, 1996, pp. 17–21.

*Primary Examiner*—Samuel A. Acquah
(74) *Attorney, Agent, or Firm*—Morgan, Lewis & Bockius LLP

(57) ABSTRACT

A polyester of general formula 1

$$RO\text{-}[(A)(B)]_n\text{-}Cox \qquad 1$$

and its use as Association Thickener in aqueous media such as paints and inks; wherein R is hydrogen or a polymerization terminating group; A is a residue of a poly-$C_{2\text{-}6}$-alkyleneglycol containing not less than 80% by weight polyethyleneglycol such as polyethyleneglycol with number average MW from 200 to 35,000; B is the residue of $C_{4\text{-}50}$-alk(en)yl succinic acid such as $C_{14}$-alkylsuccinic acid; X is hydroxy, a group ROA—, a group —OR$^1$, —NHR$^1$ or —O$^-$ M$^+$, R$^1$ is $C_{1\text{-}18}$-alk(en)yl; M$^+$ is a metal cation, and n is from 2 to 100.

14 Claims, No Drawings

POLYESTER ASSOCIATION THICKENERS

The present invention relates to novel polyesters derived from polyethyleneglycol (hereinafter PEG) and alk(en)ylsuccinic anhydrides (hereinafter ASA) and their use as "Association Thickeners" in aqueous based coatings such as paints and printing inks. Many of these polyesters are believed to function according to the "Micellar Bridging" theory.

The terms "Association Thickener" and "Micellar Bridging" are explained in U.S. Pat. No. 4,426,485 and refer to the manner by which the hydrophobic parts (hereinafter hydrophobe) of a water-soluble thickener are absorbed by a solute particle such as a latex particle to provide a network of low molecular weight thickener molecules giving good flow and levelling characteristics to water borne coatings and latex systems under high shear conditions.

Association Thickeners, including thickeners which function by Micellar Bridging theory, generally contain hydrophobes which are spaced either randomly or in clusters along a hydrophilic, especially water soluble, polymer backbone. It has now been found that polyesters which exhibit Association Thickening can be conveniently prepared by polymerising a hydroxy polyethylene alk(en)yl succinate carboxylic acid (herein after HPASCA) where the alk(en)yl hydrophobe may be distributed randomly or in clusters along the polyester backbone chain.

According to the invention there is provided a polyester of general formula 1

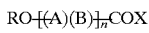COX    1 wherein

R is hydrogen or a polymerisation terminating group;

A is the residue of poly-$C_{2-6}$-alkyleneglycol containing not less than 80% by weight polyethyleneglycol;

B is the residue of $C_{4-50}$-alk(en)ylsuccinic acid;

the repeat unit represented by —(A)(B)— may be the same or different;

X is hydroxy, a group ROA—, a group —$OR^1$, —$NHR^1$ or —$O^-M^+$;

$R^1$ is $C_{1-18}$-alk(en)yl;

$M^+$ is a metal cation; and n is from 2 to 100.

The Polyester Association Thickeners of formula 1 are hereinafter referred to as PAT's.

For clarity, the residues A and B are linked via an ester group —O—CO— formed between a terminal hydroxy group of the poly($C_{2-6}$-alkyleneglycol) and a carboxylic acid group of alk(en)ylsuccinic acid or its anhydride.

It is to be understood that the repeat units —(A)(B)— of the polyester chain may contain the same or different residues A and/or the same or different residues B.

However, it is much preferred that the polyester contains different residues represented by A and/or different residues represented by B. These different residues represented by A and B may be randomly or sequentially distributed along the polyester backbone chain. It is much preferred that the residue represented by B is sequenced in the polyester backbone chain since this results in clusters of the hydrophobes which aids Micellar Bridging. This sequencing of B is readily achieved by varying the residue A.

When R is a polymerisation terminating group it is preferably $C_{1-20}$-alkyl, more preferably $C_{1-10}$-alkyl, even more preferably $C_{1-6}$-alkyl and especially $C_{1-4}$-alkyl, for example, methyl.

Preferably, R is hydrogen.

When A is the residue of a poly-$C_{2-6}$-alkylene glycol containing not less than 80% by weight polyethylene glycol it is preferably a polyalkylene glycol containing ethylene oxy (EO) and propylene oxy (PO) groups. It is particularly preferred that A contains not less An than 90% and especially not less than 95% by weight polyethylene glycol.

When A contains both EO and PO groups, it is preferred that the PO groups occupy a central position in the polyether moiety i.e. EO PO EO.

When A is polyethylene glycol it may consist of two polyethylene glycol chains linked together by a linking compound via urethane or ester groups. Examples of suitable linking compounds are dicarboxylic acids or anhydrides such as succinic anhydride, maleic anhydride and phthalic anhydride or di-isocyanates such as 1,6hexane di-isocyanate and tolyl di-isocyanate.

It is much preferred, however, that A is the residue of polyethylene glycol and that the number average molecular weight of the polyethylene glycol is preferably from 200 to 35,000.

Examples of suitable polyethylene glycols are PEG 200, PEG 1500, PEG 2000, PEG 3000, PEG 4000, PEG 6000, PEG 8000, PEG 10,000 and PEG 35,000 wherein the numbers signify approximate number average molecular weight.

Preferably, the alk(en)yl group in residue B contains not greater than 30 and especially not greater than 20 carbon atoms. It is also preferred that the alk(en)yl group contains not less than 8 and especially not less than 12 carbon atoms since this aids Micellar Bridging. The alk(en)yl group may be linear or branched. Examples of alk(en)yl groups are 2-octenyl, octadecanyl, n-decyl, n-decenyl, n-tetradecyl, n-hexadecyl, n-octadecyl, dodecenyl and polyisobutylene.

Preferably, X is hydroxy or a group $O^-M^+$. It is to be understood that $M^+$ can be a monovalent, divalent or trivalent cation. When $M^+$ represents a di-or tri-valent cation it forms a salt with two or three anions derived from the polyester of formula 1. Examples of suitable cations are ammonium, quatemary ammonium, benzalkonium, pyddinium, cetyl pyridinium, amine (primary, secondary and tertiary), alkali metal (especially sodium, potassium or lithium) and alkaline earth (especially barium, calcium and magnesium) including mixtures thereof.

Preferably, X is hydroxy.

It is preferred that n is not greater than 70, more preferably not greater than 50 and especially not greater than 30.

The number average molecular weight of the polyester of formula 1 can vary over a large range depending on the size of the hydrophobes and the length of the poly-$C_{2-6}$-alkylene glycol chain residue. Nonetheless, it is preferred that the number average molecular weight does not exceed 100,000.

The acid value of the polyester of formula 1 wherein X is hydroxy is preferably less than 25, more preferably less than 15, even more preferably less than 10 and especially not greater than 5 mg KOH/g. Particularly useful thickeners have been obtained which exhibit an acid value between 0.5 and 3 mg KOH/g.

The polyesters of formula 1 may be conveniently prepared by polymerising one or more HPASCA's of formula 2

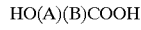    2 wherein A and B are defined hereinbefore.

The HPASCA of formula 2 itself is obtainable by reacting a poly $C_{2-6}$-alkylene glycol with an alk(en)ylsuccinic acid or preferably its anhydride (hereinafter ASA) of formula 3 in the presence of a base as catalyst and preferably in an inert atmosphere.

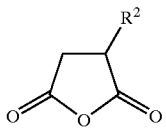

wherein $R^2$ is $C_{4-50}$-alk(en)yl which may be linear or branched.

Examples of ASA's are 2-octen-1-ylsuccinic anhydride, octadecenylsuccinic anhydride, n-decylsuccinic anhydride, n-decenylsuccinic anhydride, n-tetradecylsuccinic anhydride, n-hexadecylsuccinic anhydride, n-octadecylsuccinic anhydride, dodecenylsuccinic anhydride and poly isobutylenesuccinic an hydrides (hereinafter PIBSA).

The ASA's and PIBSA's of formula 3 are well known and can be made by any processes known to the art. Some of these processes are summarised in U.S. Pat. No. 4,749,500.

The reaction between the poly $C_{2-6}$-alkylene glycol and the ASA is preferably carried out at a temperature between 150 and 250° C. and especially between 170 and 190° C.

The base is preferably soluble in the reactants and can be a tertiary aliphatic amine, aromatic amine or pyridine derivative. Bases which are non-volatile under the reaction conditions are preferred since the equipment required does not need to be adapted to contain the base. The preferred base is 4-(N,N-dimethylamino) pyridine.

The inert atmosphere may be provided by any of the inert gases of the Periodic Table according to Mendeleev and is especially nitrogen.

The PAT's are prepared by heating one or more HPASCA's of formula 2 at between 180 and 200° C. in an inert atmosphere and preferably in the presence of an esterification catalyst such as tetra-alkyl titanate, for example tetrabutyl titanate, zinc salt of an organic acid, for example zinc acetate, zirconium salt of an aliphatic alcohol, for example zirconium isopropoxide, an aromatic acid such as toluene sulphonic acid or a strong aliphatic organic acid such as haloacetic acid, for example trifluoroacetic acid. Zirconium-n-butylate is the preferred catalyst.

When the PAT is prepared from one or more HPASCA's in a single reaction the resultant PAT consists of a polyester backbone chain wherein the hydrophobes are randomly located along the polyester chain.

However, it is also possible to sequence the hydrophobes by either polymerising one HPASCA and then reacting the resultant polymer with a different HPASCA or even a polymerised different HPASCA. This sequencing of the hydrophobes along the polyester backbone chain is an important feature of the invention since it results in clusters of the hydrophobe which aids Micellar Bridging.

Whereas it is possible to use any number of different HPASCA's to make the PAT it has been found that there is no advantage in using more than four different HPASCA's or homopolymers derived therefrom. Preferred PAT's are derivable from only the two different HPASCA's or homopolymers derived therefrom.

When the PAT contains a polymerisation terminating group R it may be conveniently prepared by reacting the final polymer containing a terminal hydroxy group with an organic moiety containing a functional group which reacts with the hydroxy group. Examples of such organic moieties are alkyl halides, di-alkylsuphates and aromatic and aliphatic carboxylic acids. When the polymerisation terminating group is alkyl, it is possible to form an alkyl end-capped HPASCA by reacting a poly $C_{2-4}$-alkylene glycol mono alkyl ether with an ASA. The resultant end-capped HPASCA may then be subsequently reacted with a HPASCA containing the same or different unit AB. The use of poly $C_{2-6}$-alkylene glycol mono alkyl ethers is less preferred since polymerisation is restricted to only one end of the HPASCA.

When the PAT contains the group —OR' or —NHR', these may be prepared under similar condition used to polymerise the HPASCA by reacting the terminal carboxylic group with an alcohol R'—OH or an amine $H_2N$—R'. When the reaction involves an amine $H_2N$—R', the esterification catalyst is not required. However, as noted hereinbefore, it is preferred that the PAT contains a terminal hydroxy group, i.e. X is hydroxy or a group —O$^-$M$^-$.

As noted hereinbefore the PAT's act as Association Thickeners in aqueous formulations such as aqueous based dispersions of particulate solids, millbases, paints and printing inks including inks used in drop-on-demand printers. Many of these polymers also function by Micellar Bridging. The PAT's can also be used to thicken aqueous dispersions and emulsions of latices, especially acrylic latices. The amount of PAT is generally less than 5%, preferably less than 3% and especially less than 1% based on the total weight of the aqueous formulation.

Thus, according to a further aspect of the invention there is provided a composition comprising water and a PAT.

There is also provided a paint or ink comprising a pigment, dispersant, water, a film-forming binder and a PAT.

The PAT may be used to thicken any aqueous or emulsion system such as aqueous coating compositions for the paper, leather and textile industries, oil well flooding compositions and drilling muds, detergents, adhesives, waxes, polishes, cosmetics and toiletries, topical pharmaceutical formulations and pesticidal or agricultural compositions for control of insects, rodents, fungi, bacteria, parasites and plant growth regulating compositions.

Toiletries includes personal care formulations which can be oil-in-water and water-in-oil formulations such as shampoos, bath gels, hair gels, hand creams, hand lotions, bath lotions, cleansing creams, hair creams and the like.

The invention is further illustrated by the following non-limiting examples whereby all references are to parts by weight unless expressed to the contrary. In these examples, the numerical value following PEG indicates the number average molecular weight of the polyethylene glycol and the length of the carbon chain attached to succinic anhydride is indicated, e.g. $C_{18}$-ASA.

EXAMPLE 1

Random Hydrophobe (PEG 8000/$C_{18}$-ASA)

Polyethylene glycol (100 parts PEG 8000, 0.0125M ex. Fluka) was stirred under a flow of nitrogen at 180° C. and then 4-N,N-dimethylamino pyridine (0.1 part, 1% based on weight of PEG 8000 ex. Aldrich) and hexadecylsuccinic anhydride (4.05 parts, 0.0125M ex. Tokyo Chemical Industries) were added. The reactants were stirred for 2.5 hours at 180° C. under nitrogen to form the PEG 8000/$C_{18}$-ASA monomer. Zirconium butylate (1 part, 1% on weight of PEG 8000 ex. Fluorochem) was then added and polymerisation effected by stirring for 16 hours under nitrogen, when the polymer exhibited an acid value of 1.16 mg KOH/g. After cooling, the polymer was obtained as an off-white solid. This is Thickener 1.

EXAMPLE 2

Random Hydrophobe (PEG 6000/$C_{14}$-ASA)

This was prepared in identical manner to Thickener 1 of Example 1 except using PEG 6000 (100 parts, 0.016M ex.

Fluka) and n-tetradecylsuccinic anhydride (4.94 parts, 0.016M ex. TCI) in place of the PEG 8000 and hexadecylsuccinic anhydride. The resultant polymer exhibited an add value below 3 mg KOH/g. This is Thickener 2.

EXAMPLES 3 TO 7

Random Hydrophobes

TABLE 1

| Example | Thickener | PEG | ASA | Acid Value (mg KOH/g) |
|---|---|---|---|---|
| 3 | 3 | 2000 | $C_{18}$-ASA | 0 |
| 4 | 4 | 3000 | $C_{18}$-ASA | 1.36 |
| 5 | 5 | 4000 | $C_{18}$-ASA | 0 |
| 6 | 6 | 6000 | $C_{18}$-ASA | 0.75 |
| 7 | 7 | 8000 | $C_{18}$-ASA | 2.69 |

EXAMPLE 8

Clustered Hydrophobe (PEG 10,000/$C_{12}$-ASA) (PEG 200/$C_{12}$-ASA)$_3$ a) PEG 10,000/$C_{12}$-ASA PEG 10,000 (100 parts, 0.01M ex. Fluka) was stirred at 200° C. under a flow of nitrogen and 4N,N-dimethylamino pyridine (0.1 part) and n-dodecylsuccinic anhydride (2.68 parts, 0.01M ex. TCI) were added. Stirring was continued at 200° C. for 2 hours under nitrogen. This is Intermediate 1.

b) PEG 200/$C_{12}$-ASA)$_3$

PEG 200 (20 parts, 0.1M ex. Fluka) was stirred under a flow of nitrogen at 200° C. and then 4-N,N-dimethylamino pyridine (0.1 part) and n-dodecylsuccinic anhydride (26.84 parts, 0.1M ex. TCI) were added. The reactants were stirred for 2 hours under nitrogen to from the PEG 200/$C_{12}$-ASA monomer. Zirconium butylate (0.5 parts) was then added and polymerisation affected by stirring at 200° C. under nitrogen for a further 2 hours. The acid value of the polymer was 46.25 mg KOH/g indicating an average of three hydrophobes in the polyester chain. This is Intermediate 2.

c) Intermediate 1 (73.7 parts, 0.007M) and Intermediate 2 (10 parts, 0.007M) were stirred under nitrogen at 200° C. and then zirconium butylate was added (0.8 parts). The reaction was continued by stirring for 20 hours under nitrogen at 200° C. when the polymer exhibited an acid value of 2.92 mg KOH/g. This is Thickener 8.

EXAMPLE 9

Random Mixed Hydrophobes (PEG 8000/$C_{18}$-ASA/$C_{14}$-ASA)

This was prepared in identical manner to Thickener 1 of Example 1 except using n-octadecylsuccinic anhydride (2.19 parts, 0.0063M, ex. TCI) and n-tetradecylsuccinic anhydride (1.85 parts, 0.0063M, ex. TCI) in place of the hexadecylsuccinic anhydride. The product exhibited an acid value of 1.85 mg KOH/g. This is Thickener 9.

EXAMPLE 10

Random Mixed Hydrophobes (PEG 8000/$C_{18}$-ASA/$C_{16}$-ASA)

This was again prepared in identical manner to Thickener 1 of Example 1 except using n-octadecylsuccinic anhydride (2.19 parts, 0.0063M ex. TCI) and n-hexadecylsuccinic anhydride (2.02 parts, 0.0063M) in place of the amount of n-hexadecylsuccinic anhydride used in Example 1. The resultant polymer exhibited an acid value of 2.04 mg KOH/g. This is Thickener 10.

EXAMPLES 11 TO 17

A white millbase was prepared by milling together an anionic dispersant (2.46 parts Disperse AYD W-22 ex Daniel Products, USA) defoamer (0.32 part Dehydran 1293 ex Henkel) titanium dioxide (43.0 parts Tioxide TR-92 ex Tioxide Ltd) and water (15–63 parts) on a Red Devil shaker for 45 minutes in the presence of 3 mm glass beads (125 parts). The beads were then removed and the millbase was let down into an acrylic resin (Neoresin XK 90 ex Avecia Ltd) at a ratio of 1:1.75 (w/w) millbase:acrylic resin.

An Association Thickener was then dissolved in a 2:1 mixture of hexyleneglycol and water to give a 35% (w/w) solution. An aliquot was then added to the above white acrylic paint to give 0.05 parts thickener in 10 parts white paint. The viscosity of the resultant paint was measured using a Bohlim V88 viscometer equipped with a 20° cone/15 mm plate diameter. The results are given in Table 2 below.

TABLE 2

| Time(s) | Shear Rate (I/S) | Viscosity (Pas) | Time(s) | Shear Rate (I/S) | Viscosity (Pas) |
|---|---|---|---|---|---|
| Thickener 1 (Example 11)* | | | Thickener 2 (Example 12) | | |
| 11.1 | 38.09 | 9.481 | 11.2 | 38.06 | 0.904 |
| 21.6 | 101.8 | 6.853 | 21.0 | 101.8 | 0.588 |
| 29.8 | 175.0 | 5.576 | 29.3 | 175.2 | 0.529 |
| 37.1 | 294.7 | 4.743 | 37.2 | 295.1 | 0.463 |
| 44.2 | 487.4 | 3.628 | 45.0 | 487.9 | 0.396 |
| 51.5 | 830.1 | 2.247 | 53.0 | 830.9 | 0.341 |
| 59.6 | 1396 | 1.257 | 61.6 | 1397 | 0.290 |
| 67.9 | 2372 | 0.648 | 70.1 | 2374 | 0.239 |
| Thickener 3 (Example 13) | | | Thickener 4 (Example 14) | | |
| 11.2 | 38.07 | 1.732 | 11.3 | 38.0 | 0.279 |
| 21.0 | 101.8 | 0.279 | 21.1 | 101.8 | 0.138 |
| 29.4 | 175.3 | 0.144 | 29.3 | 175.2 | 0.102 |
| 37.3 | 295.1 | 0.101 | 37.2 | 295.1 | 0.090 |
| 45.0 | 487.9 | 0.062 | 45.0 | 487.9 | 0.066 |
| 53.0 | 830.9 | 0.045 | 52.9 | 830.9 | 0.059 |
| 61.4 | 1397 | 0.030 | 81.5 | 1397 | 0.046 |
| 69.6 | 2374 | 0.024 | 70.5 | 2374 | 0.040 |
| Thickener 5 (Example 15) | | | Thickener 6 (Example 16) | | |
| 11.2 | 38.04 | 0.301 | 11.2 | 38.05 | 0.833 |
| 21.0 | 101.8 | 0.218 | 21.0 | 101.8 | 0.650 |
| 29.3 | 175.2 | 0.184 | 29.3 | 175.2 | 0.513 |
| 37.2 | 295.1 | 0.152 | 37.2 | 295.1 | 0.387 |
| 45.0 | 487.9 | 0.115 | 44.9 | 487.9 | 0.284 |
| 52.9 | 830.9 | 0.093 | 52.8 | 830.9 | 0.207 |
| 60.6 | 1397 | 0.070 | 61.2 | 1397 | 0.142 |
| 69.8 | 2374 | 0.056 | 69.8 | 2374 | 0.099 |
| Thickener 7 (Example 17) | | | | | |
| 11.2 | 38.08 | 1.859 | | | |
| 21.0 | 101.8 | 1.289 | | | |
| 30.0 | 175.3 | 0.993 | | | |
| 37.9 | 295.1 | 0.740 | | | |
| 45.8 | 487.9 | 0.518 | | | |
| 53.7 | 830.9 | 0.355 | | | |
| 62.2 | 1397 | 0.234 | | | |
| 71.3 | 2374 | 0.150 | | | |

*Footnote to Table 2

Example 11 contains 0.06 parts Thickener 1.

EXAMPLE 18 to 38

Random Hydrophobes With Single PEG

Example 1 was repeated using different polyethyleneglycol with differing number average molecular weight (PEG)

and different alk(en)yl succinic anhydride derivatives (ASA) to give the PAT's indicated in Table 3 below. In the table, the ratio of PEG to ASA is 1:1 and the number of carbon atoms in the alkyl chain of the ASA is as indicated. The descriptor (ene) indicates that the alkyl chain is unsaturated.

TABLE 3

| Example | Thickener | Structure | Mn of PEG | alk(en)yl chain length of ASA | Acid value (mg KOH/g) |
|---|---|---|---|---|---|
| 16 | 11 | 1500/$C_{12}$ (ene) | 1500 | $C_{12}$ (ene) | 2.22 |
| 19 | 12 | 2000/$C_{12}$ | 2000 | $C_{12}$ | 5.51 |
| 20 | 13 | 3000/$C_{12}$ (ene) | 3000 | $C_{12}$ (ene) | 1.86 |
| 21 | 14 | 4000/$C_{12}$ (ene) | 4000 | $C_{12}$ (ene) | 1.64 |
| 22 | 15 | 6000/$C_{12}$ (ene) | 6000 | $C_{12}$ (ene) | 4.0 |
| 23 | 16 | 8000/$C_{12}$ | 8000 | $C_{12}$ | 4.58 |
| 24 | 17 | 3000/$C_{18}$ (ene) | 3000 | $C_{18}$ (ene) | 1.36 |
| 25 | 18 | 4000/$C_{16}$ (ene) | 4000 | $C_{18}$ (ene) | 0 |
| 26 | 19 | 6000/$C_{18}$ (ene) | 6000 | $C_{18}$ (ene) | 0.75 |
| 27 | 20 | 4000/$C_{18}$ | 4000 | $C_{16.}$ | 2.64 |
| 28 | 21 | 6000/$C_{16}$ | 6000 | $C_{16}$ | 2.0 |
| 29 | 22 | 8000/$C_{14}$ | 8000 | $C_{14}$ | 1.34 |
| 30 | 23 | 4000/$C_{18}$ | 4000 | $C_{18}$ | 0 |
| 31 | 24 | 8000/$C_{18}$ (ene) | 8000 | $C_{18}$ (ene) | 2.69 |
| 32 | 25 | 2000/$C_{18}$ (ene) | 2000 | $C_{18}$ (ene) | 0 |
| 33 | 26 | 4000/$C_{8}$ (ene) | 4000 | $C_{8}$ (ene) | 0 |
| 34 | 27 | 8000/$C_{12}$ | 8000 | $C_{12}$ | 0 |
| 35 | 28 | 1500/$C_{12}$ | 1500 | $C_{12}$ | 1.66 |
| 36 | 29 | 1500/$C_{12}$ | 1500 | $C_{12}$ | 0 |
| 37 | 30 | 3000/$C_{8}$ | 3000 | $C_{8}$ | 1.21 |
| 38 | 31 | 6000/$C_{12}$ | 6000 | $C_{12}$ | 1.84 |

EXAMPLES 39 TO 44

Random Hydrophobes With Mixed PEG

Example 1 was again repeated but using mixtures of polyethleneglycols with differing number average molecular weights as indicated in Table 4 below wherein the molar ratio of the PEG's and ASA is as indicated.

TABLE 4

| Example | Thickener | Structure | M lar Ratio of PEG1/PEG2/ASA | Acid Value (mg KOH/g) |
|---|---|---|---|---|
| 39 | 32 | 12000/200/$C_{14}$ | 1:1:2 | 6.38 |
| 40 | 33 | 10000/600/$C_{14}$ | 1:4:5 | 1.97 |
| 41 | 34 | 10000/600/$C_{14}$ | 1:4:5 | 0 |
| 42 | 35 | 12000/200/$C_{14}$ | 1:1:2 | 0 |
| 43 | 36 | 10000/600/$C_{14}$ | 1:7:8 | 2.21 |
| 44 | 37 | 10000/600/$C_{14}$ | 1:3:4 | 1.46 |

EXAMPLES 45 TO 51

Clustered Hydrophobes

Example 8 was repeated using different polyethyleneglycol/ASA intermediates to obtain in the thickeners having clustered hydrophobes indicated in Table 5 below.

TABLE 5

| Example | Thickener | Intermediate I | Intermediate II | Molar Ratio of Int. I to Int. II | Acid Value (mg KOH/g) |
|---|---|---|---|---|---|
| 45 | 38 | 10000/$C_{10}$ | (200/$C_{10}$)$_4$ | 1:1 | 2.63 |
| 46 | 39 | 10000/$C_{12}$ | (300/$C_{12}$)$_5$ | 1:1 | 2.73 |
| 47 | 40 | 10000/$C_{14}$ | (600/$C_{14}$)$_8$ | 1:1 | 1.76 |
| 48 | 41 | 10000/$C_{14}$ | (400/$C_{14}$)$_7$ | 1:1 | 0 |
| 49 | 42 | 10000/$C_{12}$ | (400/$C_{12}$)$_7$ | 1:1 | 1.99 |
| 50 | 43 | 10000/$C_{14}$ | (C200/$C_{14}$)$_{4.2}$ | 1:1 | 2.68 |
| 51 | 44 | 10000/$C_{14}$ | (200/$C_{14}$)$_4$ | 1:1 | 2.83 |

*Footnote to Table 5

The numeric values in the column headed Intermediate II indicates the number of repeat units of PEG/ASA monomer.

EXAMPLE 52

Symmetrical Hydrophobe (PEG 1000/$C_{14}$)$_9$ (PEG 35000) (PEG 1000/$C_{14}$)$_9$ a) (PEG 1000/$C_{14}$)$_9$ Polyethyleneglycol Mn 1000 (50.59 parts, 0.05 m ex Fluka) was added to a mixture of 4-N,N-dimethylaminopyridine (0.1 parts, ex Aldrich) and n-tetradecyl succinic anyhydride (15 parts, 0.05M ex TCI) at 200° C. under nitrogen. The reactants were stirred for 2 hours at 200° C. Zirconium n-butylate (0.5 parts) was added and the reaction continued by stirring under nitrogen at 200° C. for a further 18 hours. The polymer had an Acid Value of 4.77 mg KOH/g.

b) Title Polymer

Polyethyleneglycol Mn 35000 (29.75 parts, 0.85 mM ex Fluka) was added to the polymer from (a) (20 parts, 1.70 mM) and the reactants were stirred under nitrogen at 200° C. when zirconium n-butylate (0.5 parts) was added. The reaction was continued by stirring under nitrogen at 200° C. for 48 hours when the reaction mix became very viscous. After cooling, the product was obtained as a white solid with an Acid Value of 1.34 mg KOH/g. This is Thickener 45.

EXAMPLES 53 to 71

Examples 11 to 17 were repeated except that the viscosity of the white paints containing 0.5% w/w thickener was measured on the Bohlin V88 Viscometer using a 2.5° cone/15 mm plate diameter. The results are given in Table 6 below.

TABLE 6

| | | Viscosity (Pas) | | | | | | | |
|---|---|---|---|---|---|---|---|---|---|
| | Time (Secs) | 11.1 | 21.6 | 29.8 | 37.1 | 44.2 | 51.5 | 59.6 | 67.9 |
| | Shear Rate ⅛ | 38 | 102 | 175 | 295 | 487 | 829 | 1395 | 2370 |
| Example | Thickener | | | | | | | | |
| 53 | 12 | 0.170 | 0.052 | 0.031 | 0.017 | 0.002 | 0.003 | 0.004 | 0.003 |
| 54 | 13 | 0.169 | 0.055 | 0.030 | 0.020 | 0.011 | 0.015 | 0.011 | 0.010 |
| 55 | 14 | 0.231 | 0.058 | 0.036 | 0.022 | 0.018 | 0.019 | 0.014 | 0.013 |
| 56 | 15 | 0.168 | 0.095 | 0.057 | 0.038 | 0.028 | 0.028 | 0.021 | 0.020 |
| 57 | 17 | 0.279 | 0.138 | 0.102 | 0.090 | 0.066 | 0.059 | 0.046 | 0.037 |
| 58 | 18 | 0.301 | 0.218 | 0.184 | 0.152 | 0.115 | 0.093 | 0.070 | 0.056 |

TABLE 6-continued

| | | Viscosity (Pas) | | | | | | | |
|---|---|---|---|---|---|---|---|---|---|
| Time (Secs) | | 11.1 | 21.6 | 29.8 | 37.1 | 44.2 | 51.5 | 59.6 | 67.9 |
| Shear Rate 1/s | | 38 | 102 | 175 | 295 | 487 | 829 | 1395 | 2370 |
| 59 | 19 | 0.833 | 0.650 | 0.513 | 0.387 | 0.284 | 0.207 | 0.142 | 0.100 |
| 60 | 20 | 1.237 | 0.897 | 0.756 | 0.612 | 0.459 | 0.335 | 0.231 | 0.152 |
| 61 | 21 | 0.618 | 0.479 | 0.408 | 0.329 | 0.254 | 0.198 | 0.144 | 0.104 |
| 62 | 22 | 1.146 | 0.926 | 0.807 | 0.718 | 0.635 | 0.562 | 0.489 | 0.403 |
| 63 | 23 | 0.433 | 0.272 | 0.206 | 0.164 | 0.112 | 0.087 | 0.066 | 0.052 |
| 64 | 24 | 1.859 | 1.289 | 0.993 | 0.740 | 0.518 | 0.355 | 0.234 | 0.150 |
| 65 | 25 | 1.732 | 0.279 | 0.144 | 0.101 | 0.062 | 0.045 | 0.030 | 0.024 |
| 66 | 26 | 0.095 | 0.027 | 0.041 | 0.035 | 0.025 | 0.024 | 0.024 | 0.018 |
| 67 | 27 | 0.014 | 0.038 | 0.016 | 0.013 | 0.006 | 0.007 | 0.007 | 0.006 |
| 68 | 33 | 5.305 | 2.643 | 1.829 | 1.270 | 0.906 | 0.651 | 0.461 | 0.325 |
| 69 | 38 | 1.946 | 1.096 | 0.787 | 0.558 | 0.392 | 0.277 | 0.190 | 0.126 |
| 70 | 39 | 2.377 | 1.477 | 1.067 | 0.760 | 0.526 | 0.371 | 0.252 | 0.173 |
| 71 | 40 | 3.757 | 2.289 | 1.678 | 1.231 | 0.893 | 0.657 | 0.480 | 0.343 |

EXAMPLES 72 TO 79

The viscosity of 5% w/w solutions of thickener in water at 20° C. was measured using a rheometer supplied by TA Instruments, model CSL² 500HR fitted with a 4 cm parallel steel plate set at a 250μ gap. The results are given in Table 7 below.

TABLE 7

| | | Viscosity (Pas) | | | | | | | |
|---|---|---|---|---|---|---|---|---|---|
| | Time (Secs) | 45.5 | 60.1 | 74.8 | 79.7 | 94.3 | 108.9 | 113.7 | 118.6 |
| | Shear Rate 1/s | 14.8 | 39.54 | 105.5 | 145.5 | 388.2 | 1024 | 1419 | 1961 |
| Example | Thickener | | | | | | | | |
| 72 | 34 | 30.56 | 10.38 | 4.29 | 3.40 | 1.87 | 1.50 | 1.20 | 0.94 |
| 73 | 35 | 1.76 | 1.64 | 1.53 | 1.50 | 1.33 | 1.05 | 0.94 | 0.83 |
| 74 | 41 | 52.16 | 19.72 | 7.12 | 5.01 | 1.76 | 0.81 | 0.63 | 0.49 |
| 75 | 42 | 8.63 | 8.92 | 9.07 | 8.54 | 3.87 | 1.55 | 0.75 | 0.77 |
| 76 | 36 | 70.43 | 21.63 | 6.18 | 4.34 | 1.20 | 0.47 | 0.36 | 0.29 |
| 77 | 37 | 63.11 | 13.06 | 4.63 | 2.22 | 0.86 | 0.41 | 0.30 | 0.23 |
| 78 | 43 | 21.11 | 12.84 | 6.44 | 5.20 | 2.82 | 1.57 | 1.28 | 1.03 |
| 79 | 44 | 18.37 | 9.08 | 4.77 | 3.91 | 2.24 | 1.32 | 1.12 | 0.93 |

What is claimed is:

1. A polyester of general formula 1

RO—[(A)(B)]$_n$—COX    1 wherein
R is hydrogen or a polymerisation terminating group;
A is the residue of poly-$C_{2-6}$-alkyleneglycol containing not less than 80% by weight polyethylene glycol;
B is the residue of $C_{4-50}$-alk(en)yl succinic acid;
the repeat unit represented by —(A)(B)— may be the same or different;
X is hydroxy, a group ROA—, a group —OR', —NHR' or —O–M⁺;
R' is $C_{1-18}$-alk(en)yl;
M⁺ is a metal cation; and
n is from 2 to 100.

2. A polyester as claimed in claim 1 wherein the polyester contains different residues represented by A and/or different residues represented by B.

3. A polyester as claimed in claim 2 wherein B is sequenced in the polyester backbone chain to give clusters of hydrophobes attached to B.

4. A polyester as claimed in claim 3 wherein R is hydrogen.

5. A polyester as claimed in claim 4 wherein A is the residue of polyethylene glycol.

6. A polyester as claimed in claim 5 wherein the number average molecular weight of the polyethylene glycol is from 200 to 35,000.

7. A polyester as claimed in claim 6 wherein the alk(eny)yl group of the residue of succinic acid represented by B contains not less than 12 and not greater than 20 carbon atoms.

8. A polyester as claimed in claim 7 wherein n is not greater than 30.

9. A polyester as claimed in claim 7 wherein the number average molecular weight of the polyester is not greater than 100,000.

10. A polyester as claimed in claim 7 wherein the acid value of the polyester wherein X is hydroxy is between 0.5 and 3 mg KOH/g.

11. A method of preparing a polyester as claimed in claim 1 which comprises polymerising a compound of formula 2 in the presence of an esterification catalyst and in an inert atmosphere;

HO(A)(B)—COOH    2 wherein
A is the residue of poly-$C_{2-6}$-alkylene glycol containing not less than 80% by weight polyethylene glycol; and
B is the residue of $C_{4-50}$-alk(en)yl succinic acid.

12. An aqueous formulation thickened with a polyester or formula 1

$$RO\text{-}[(A)(B)]_n\text{-}COX \qquad 1$$

wherein

R is hydrogen or a polymerisation terminating group;

A is the residue of poly-$C_{2-6}$-alkyleneglycol containing not less than 80% by weight polyethylene glycol;

B is the residue of $C_{4-50}$-alk(en)yl succinic acid;

the repeat unit represented by —(A)(B)— may be the same or different;

X is hydroxy, a group ROA—, a group —OR', —NHR' or —O⁻M⁺;

R' is $C_{1-18}$-alk(en)yl;

M⁺ is a metal cation; and n is from 2 to 100.

13. A composition comprising water and a polyester of formula 1

$$RO\text{-}[(A)(B)]_n\text{-}COX \qquad 1$$

wherein

R is hydrogen or a polymerisation terminating group:

A is the residue of poly-$C_{2-6}$-alkyleneglycol containing not less than 80% by weight polyethylene glycol;

B is the residue of $C_{4-50}$-alk(en)yl succinic acid;

the repeat unit represented by —(A)(B)— may be the same or different;

X is hydroxy, a group ROA—, a group —OR', —NHR' or —O⁻M⁺;

R' is $C_{1-18}$-alk(en)yl;

M⁺ is a metal cation; and n is from 2 to 100.

14. A paint or ink comprising water, pigment, dispersant, film-forming binder resin and a polyester of formula 1

$$RO\text{-}[(A)(B)]_n\text{-}COX \qquad 1$$

wherein

R is hydrogen or a polymerisation terminating group;

A is the residue of poly-$C_{2-6}$-alkyleneglycol containing not less than 80% by weight polyethylene glycol;

B is the residue of $C_{4-50}$-alk(en)yl succinic acid;

the repeat unit represented by —(A)(B)— may be the same or different;

X is hydroxy, a group ROA—, a group —OR', —NHR' or —OM⁺;

R' is $C_{1-18}$-alk(en)yl;

M⁺ is a metal cation; and n is from 2 to 100.

\* \* \* \* \*